United States Patent
Suzuki et al.

(10) Patent No.: US 8,818,414 B2
(45) Date of Patent: Aug. 26, 2014

(54) MOBILE STATION, COMMUNICATION SYSTEM, AND COMMUNICATION METHOD FOR COLLECTING LOCATION INFORMATION OF A MOBILE STATION

(75) Inventors: Toshihiro Suzuki, Yokohama (JP); Ichiro Okajima, Yokosuka (JP); Hiroshi Kawakami, Yokosuka (JP); Manhee Jo, Yokohama (JP); Daisuke Ochi, Yokosuka (JP); Tomohiro Nagata, Tokyo (JP); Motonari Kobayashi, Yokohama (JP); Yuki Oyabu, Zushi (JP)

(73) Assignee: NTT DoCoMo, Inc., Tokyo (JP)

( * ) Notice: Subject to any disclaimer, the term of this patent is extended or adjusted under 35 U.S.C. 154(b) by 381 days.

(21) Appl. No.: 13/259,597

(22) PCT Filed: Mar. 23, 2010

(86) PCT No.: PCT/JP2010/054970
§ 371 (c)(1),
(2), (4) Date: Nov. 22, 2011

(87) PCT Pub. No.: WO2010/113699
PCT Pub. Date: Oct. 7, 2010

(65) Prior Publication Data
US 2012/0064915 A1  Mar. 15, 2012

(30) Foreign Application Priority Data
Apr. 1, 2009 (JP) ................................ 2009-089118

(51) Int. Cl.
*H04W 24/00* (2009.01)
*H04W 4/02* (2009.01)
*H04W 4/22* (2009.01)
*H04W 64/00* (2009.01)

(52) U.S. Cl.
CPC . *H04W 4/02* (2013.01); *H04W 4/22* (2013.01); *H04W 64/00* (2013.01)
USPC .................... 455/456.3; 455/456.1; 455/456.2

(58) Field of Classification Search
None
See application file for complete search history.

(56) References Cited

U.S. PATENT DOCUMENTS 8,265,611 B2 * 9/2012 Hampel et al. ............. 455/414.2
2009/0068992 A1 * 3/2009 Takehara et al. ........... 455/412.1

OTHER PUBLICATIONS

Office Action issued Jun. 11, 2013, in Japanese Patent Application No. 2011-507105 with English translation.

(Continued)

*Primary Examiner* — Suhail Khan
(74) *Attorney, Agent, or Firm* — Oblon, Spivak, McClelland, Maier & Neustadt, L.L.P.

(57) ABSTRACT

A mobile station, a communication system, and a communication method that are capable of efficiently collecting location information of any user. A communicating module receives a positioning request including attribute specifying information from a management center, a determining module determines whether measurements of the location are necessary or not based on the attribute specifying information in the received positioning request and the attribute information stored in advance. Then, when the determining module determines that measurements of the location are necessary, a positioning module performs measurements of the location and sends location information thus measured to the management center. Accordingly, it is possible to collect the location information of the mobile station that agrees with an attribute that the management center desires and therefore, it is possible to provide an attentive service and the like based on the location information.

13 Claims, 10 Drawing Sheets

(56) References Cited

OTHER PUBLICATIONS

Minoru Matsui, et al., "Adaptive Management of Location Mechanisms for Available Services", IPSJ SIG Technical Report, vol. 2005, No. 107, Nov. 2, 2005, pp. 21-24 with English Abstract and English translation.

International Preliminary Report on Patentability Issued on Nov. 15, 2011 in PCT/JP10/54970 filed Mar. 23, 2010.

* cited by examiner

Fig.3

| ATTRIBUTE | VALUE |
|---|---|
| GENDER | MALE/FEMALE |
| AGE | 25 |
| ADDRESS | AA, TOKYO |
| LOCATION | Y NORTH LATITUDE, X LATITUDE |
| OCCUPATION | STUDENT/WORKING ADULT AND THE LIKE |
| ACTIVITY STATE | AT WORK/IN SHOPPING AND THE LIKE |
| MIGRATION STATE | IN HIGH-SPEED MOVING/IN LOW-SPEED MOVING AND THE LIKE |
| ACTIVITY AREA SIZE | WIDE RANGE/NARROW RANGE AND THE LIKE |
| USAGE STATE OF A SERVICE | HIGH FREQUENCY/LOW FREQUENCY AND THE LIKE |
| USAGE STATE OF B SERVICE | HIGH FREQUENCY/LOW FREQUENCY AND THE LIKE |
| ... | ... |
| XXXX | XXXXXXXXXXXXX |

Fig.5
(a)
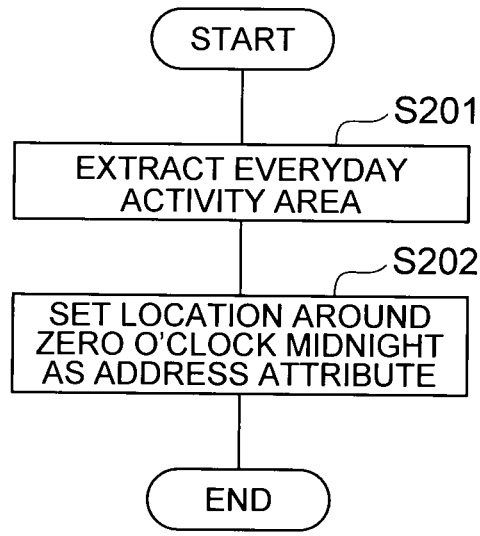
(b)
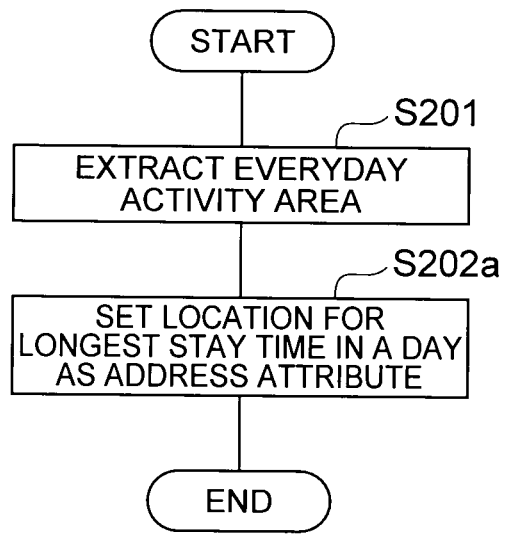

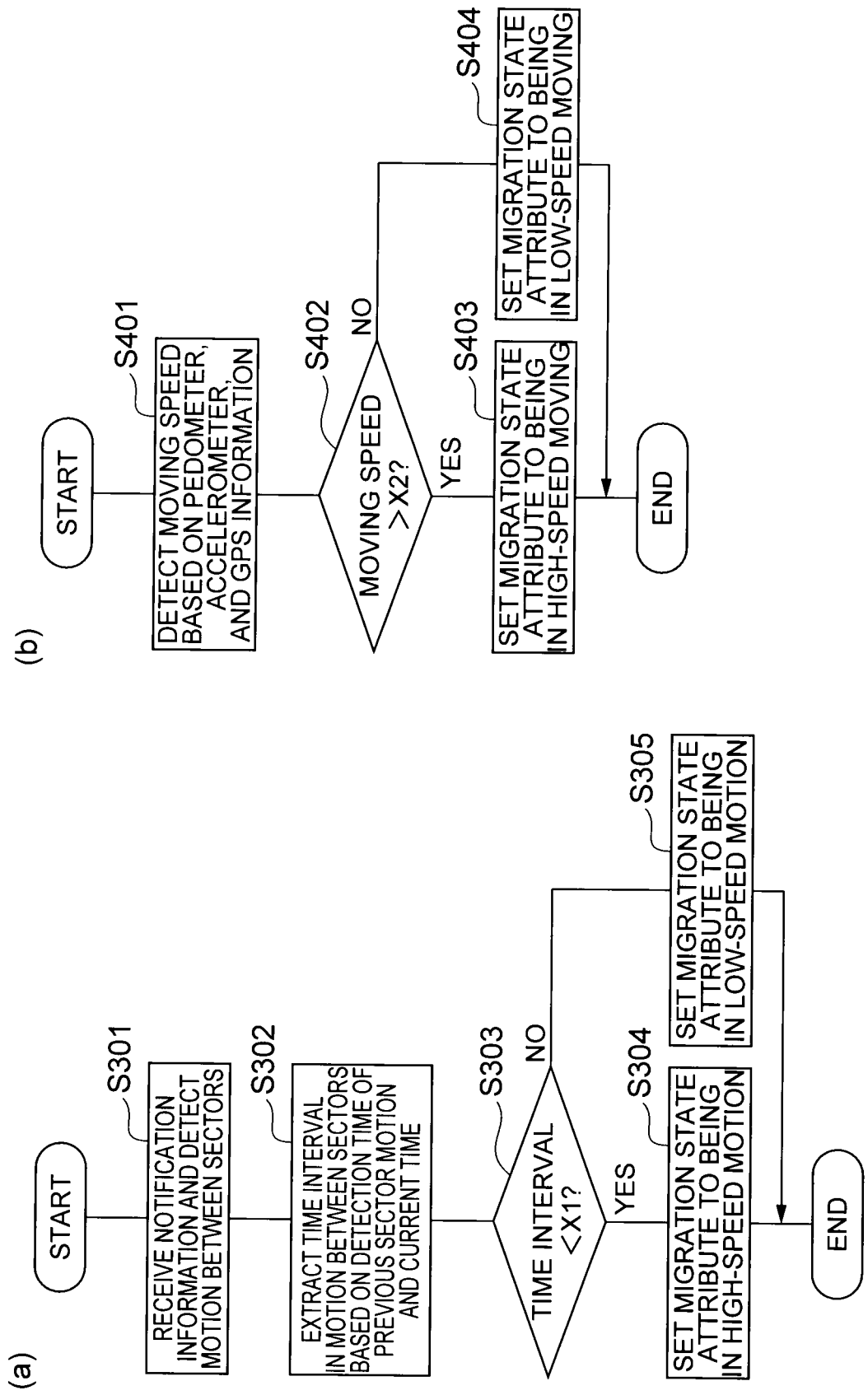

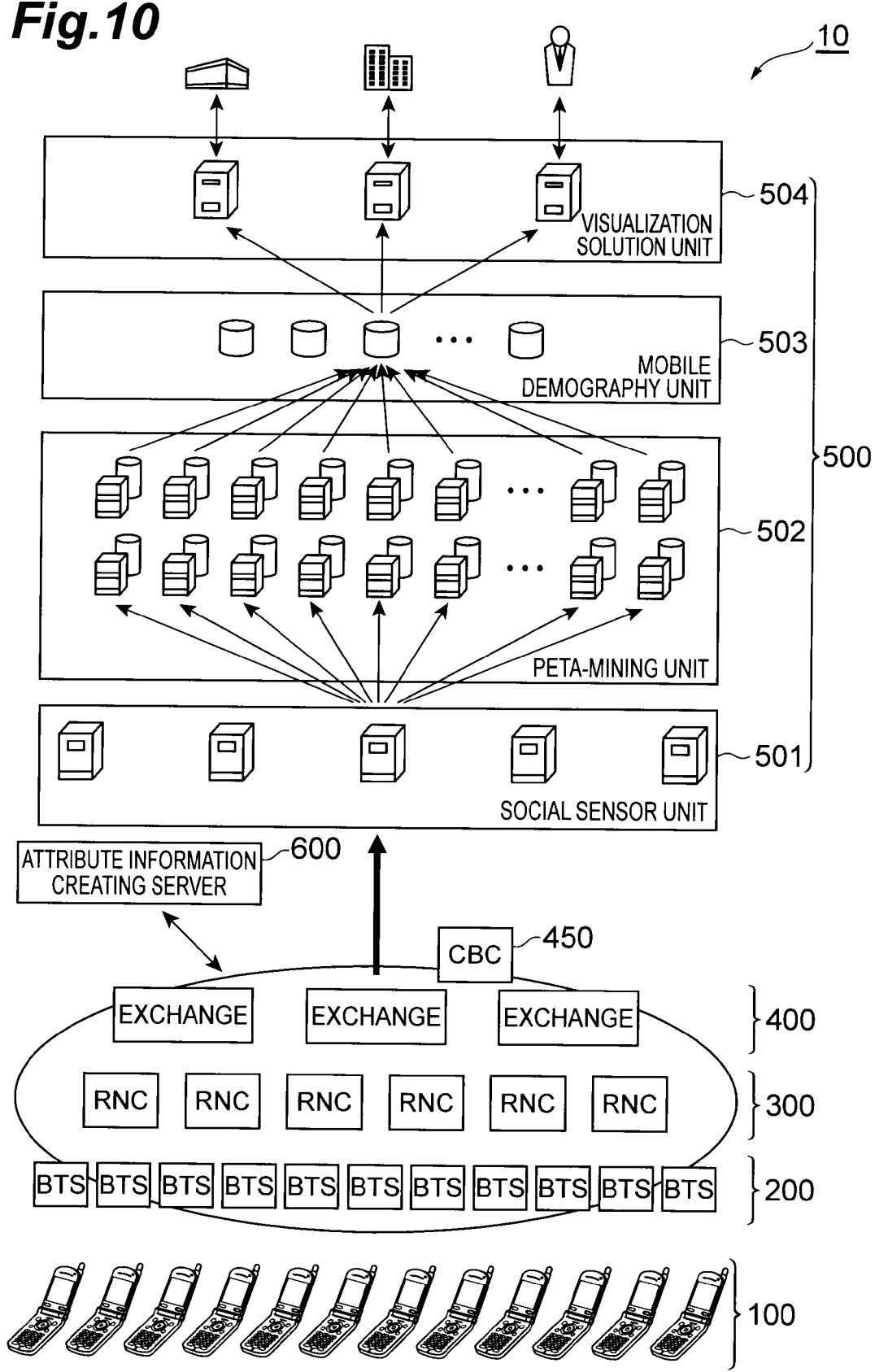

MOBILE STATION, COMMUNICATION SYSTEM, AND COMMUNICATION METHOD FOR COLLECTING LOCATION INFORMATION OF A MOBILE STATION

TECHNICAL FIELD

The present invention relates to a mobile station, a communication system, and a communication method that perform measurements of the location information.

BACKGROUND ART

A method for collecting location information is specified in the 3GPP, for example, where upon receiving a request from an external server to collect location information of each mobile station, a management server of a carrier operator outputs, in accordance with the request, an instruction to collect the location information of each mobile station to a exchanger (for example, a mobile multimedia switching system (MMS)/a serving/gateway general packet radio service support node (xGSN) and a radio network controller (RNC)) and each node and the controller perform processing to collect the location information. This processing sequence is specified in the 3rd generation partnership project (3GPP) as a mobile terminated-location request (MT-LR) method and is described in Non Patent Literature 1, the 3rd generation partnership project (3GPP) TS23.271, for example.

CITATION LIST

Non Patent Literature

Non Patent Literature 1: 3rd generation partnership project (3GPP) TS23.271

SUMMARY OF INVENTION

Technical Problem

In a technology described in Non Patent Literature 1, however, a positioning request is made to all specified mobile stations and it is difficult to collect location information of any part of the users. That is, each user needs to be specified to perform processing of a location information request, which causes a lot of trouble to a location information collecting side.

Therefore, the present invention aims to provide a mobile station, a communication system, and a communication method that are capable of efficiently collecting location information of any user.

Solution to Problem

In order to solve the problems described above, a mobile station of the present invention includes: attribute information storage means for storing attribute information; receiving means for receiving a positioning request including attribute information from an external center; determining means for determining, based on the positioning request received by the receiving means and the attribute information stored in the attribute information storage means, whether measurements of the location are necessary or not; positioning means for performing measurements of the location when the determining means determines that measurements of the location are necessary; and notifying means for notifying of location information measured by the positioning means.

In another aspect, a communication method of the present invention includes: a receiving step of receiving a positioning request including attribute information from an external center; a determining step of determining, based on the positioning request received at the receiving step and attribute information stored in attribute information storage means, whether measurements of the location are necessary or not; a positioning step of performing measurements of the location when it is determined at the determining step that measurements of the location are necessary; and a notifying step of notifying of location information measured at the positioning step.

According to the invention, the positioning request including attribute information is received from the external center and based on the received positioning request and the attribute information previously stored, it is determined whether measurements of the location are necessary or not. Then, when it is determined that measurements of the location are necessary, measurements of the location are performed and the location information thus measured is notified. Accordingly, it is possible to collect the location information of the mobile station that agrees with an attribute that the management center desires and therefore, it is possible to provide an attentive service and the like based on the location information. For example, when the attribute information is set to the twenties, and an attribute specifying information is set to male, it is possible to grasp a mobile history and the like of the mobile station that agrees with such an attribute. Accordingly, such a mobile history can be used to facilitate store development and the like.

Furthermore, the mobile station of the present invention may further include positioning area storage means for storing a positioning time period or a positioning area, the positioning means preferably performs measurements of the location on a condition that it is determined by the determining means that the mobile station is being located in the positioning area stored in the positioning area storage means or that a current time is included in the time period stored in the positioning area storage means.

According to the invention, measurements of the location are performed on the condition that it is determined to be located in the positioning area or included in the time period that are stored and therefore, it is possible to collect location information for more detailed analysis. For example, it is possible to easily grasp the number of people whose attribute information is set to male and being located in a given positioning area.

Furthermore, in the mobile station of the present invention, the attribute information stored in the attribute information storage means preferably includes user attribute information representing a user attribute.

According to the invention, the attribute information is the information representing the user attribute and therefore, it is possible to efficiently collect location information focusing on the user attribute. For example, it is possible to collect location information depending on a gender.

Furthermore, in the mobile station of the present invention, the attribute information stored in the attribute information storage means preferably includes activity state information representing a user activity.

According to the invention, the attribute information is the activity state information representing the user activity and therefore, it is possible to efficiently collect location information focusing on a state of the user activity. For example, it is possible to collect location information of a user who is moving in high-speed with a car and the like.

Furthermore, in the mobile station of the present invention, the attribute information stored in the attribute information storage means preferably includes usage state information representing a usage state of a terminal by a user.

According to the invention, the attribute information is the usage state information representing a usage state of the terminal by the user and therefore, it is possible to efficiently collect location information focusing on the usage state of the terminal by the user. For example, it is possible to collect location information of a user who uses a given application.

In another aspect, a communication system of the present invention includes the mobile station mentioned above and a location information storage apparatus for storing location information transmitted from the mobile station.

Thereby, it is possible to grasp the location information in the mobile station, to perform statistical processing etc., on the grasped location information and to provide data obtained by statistical processing outside.

Advantageous Effects of Invention

According to the present invention, it is possible to collect location information of the mobile station that agrees with an attribute that the management center desires and provision of an attentive service based on the location information and the like becomes possible. For example, when the attribute information is set to the twenties, and the attribute specifying information is set to male, it is possible to grasp a mobile history and the like of the mobile station that agrees with such an attribute. Accordingly, such a mobile history can be used to facilitate store development and the like.

BRIEF DESCRIPTION OF DRAWINGS

FIG. 3 is a diagram describing attribute information that an attribute information storage module 102 stores.

FIG. 5 is flowchart illustrating processing of an attribute information creating module 106 when attribute information indicating an address is created.

FIG. 9 is a flowchart illustrating processing of the attribute information creating module 106 when attribute information indicating a migration state is created.

FIG. 10 is a system block diagram of the communication system 10 using the mobile station 100 in a modification of the present embodiment.

REFERENCE SIGNS LIST

10 . . . communication system, 100 . . . mobile station, 101 . . . communicating module, 102 . . . attribute information storage module, 103 . . . positioning area storage module, 104 . . . determining module, 105 . . . positioning module, 106 . . . attribute information creating module, 200 . . . base transceiver station, 400 . . . exchanger, 500 . . . management center, 501 . . . social sensor unit, 502 . . . peta-mining unit, 503 . . . mobile demography unit, 504 . . . visualization solution unit, 600 . . . attribute information creating server

DESCRIPTION OF EMBODIMENTS

With reference to accompanying drawings, embodiments of the present invention will be described. Whenever possible, the same reference sign is given to the same part and redundant explanation will be omitted.

Figure 1:
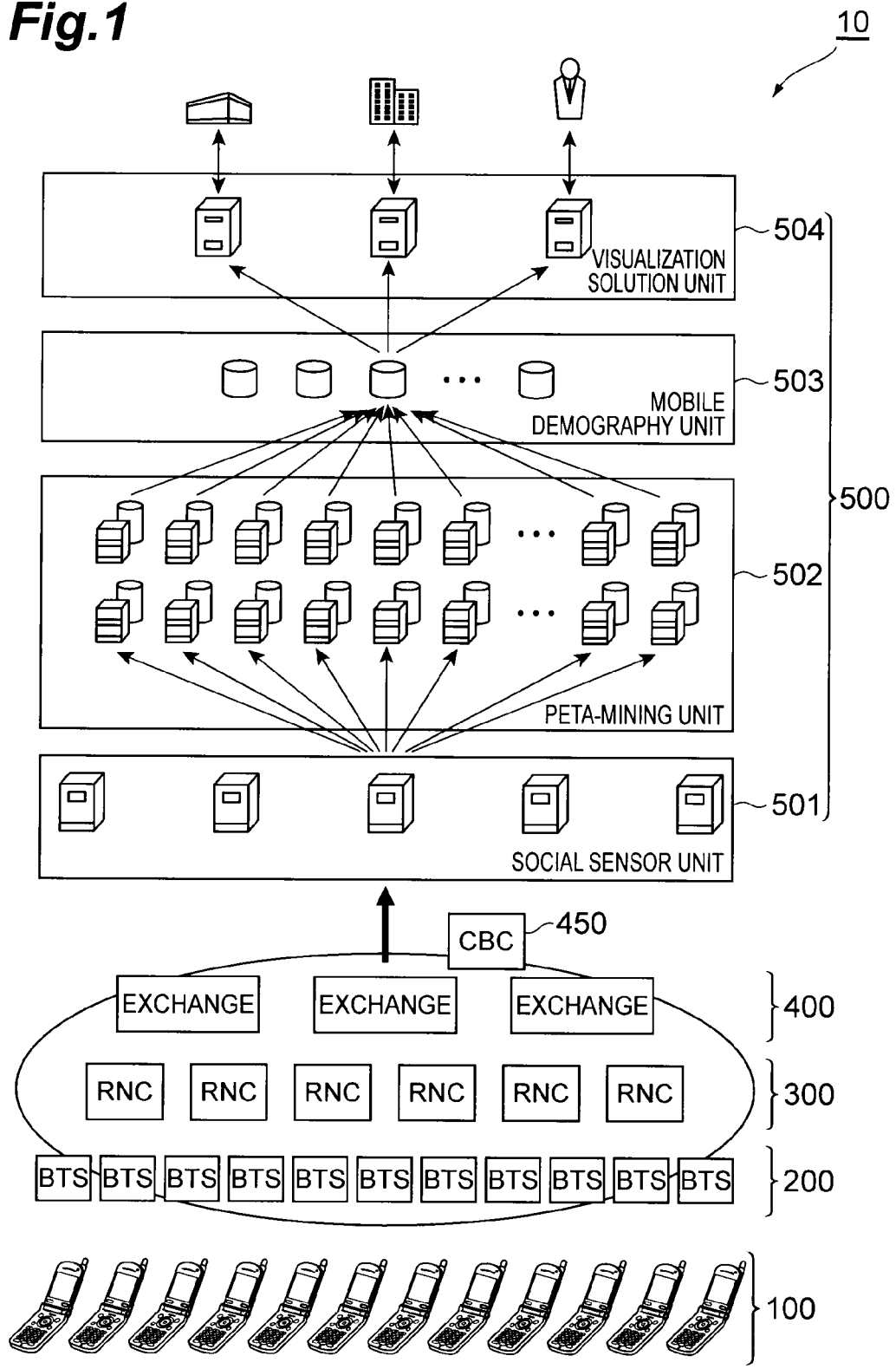
FIG. 1 is a system block diagram of a communication system 10 using a mobile station 100 of the present embodiment.

FIG. 1 is a system block diagram of a communication system 10 of the first embodiment. As illustrated in FIG. 1, the communication system 10 is configured to include mobile stations 100, BTSs (Base Transceiver Stations) 200, RNCs (Radio Network Controllers) 300, exchangers 400, and a management center 500. Moreover, the management center 500 is configured with social sensor units 501, peta-mining units 502, mobile demography units 503, and visualization solution units 504.

Before collecting location information of the mobile station 100 through the exchangers 400, the BTSs 200, and the RNCs 300, the management center 500 transmits attribute specifying information for specifying a collecting target of location information to the mobile station 100. Upon receiving the attribute specifying information, the mobile station 100 determines whether the received attribute specifying information agrees with attribute information stored in the mobile station 100 or not, and performs measurements of the location when both information agree with each other.

Furthermore, as described above, the management center 500 is configured to include the social sensor units 501, the peta-mining units 502, the mobile demography units 503, and the visualization solution units 504. Location information of the mobile stations 100 is stored at least in any one unit of each unit serving as a location information storage apparatus and the stored location information is used to perform statistical processing. Furthermore, before collecting the location information of the mobile station 100 through the exchangers 400, the BTSs 200, and the RNCs 300, the management center 500 may transmit positioning management information including a cell ID and positioning performance time information to the mobile station 100. In that case, upon receiving the cell ID and the positioning performance time information, the mobile station 100 stores the cell ID and the positioning performance time information, which may be used to determine whether to perform measurements of the location. For example, the mobile station 100 performs measurements of the location when entering a base transceiver station area defined by the cell ID during a time period designated by the positioning performance time information, in addition to when the attribute information thereof agrees with the attribute specifying information.

Each of the social sensor units 501 is a server apparatus for collecting data including the location information of the mobile station 100 and the like from each exchanger 400. The social sensor unit 501 is configured to be capable of receiving data regularly output from the exchanger 400 and of acquiring data from the exchanger 400 at a timing predetermined by the social sensor unit 501.

Each of the peta-mining units 502 is a server apparatus for converting the data received from the social sensor unit 501 to a given data form. For example, the peta-mining unit 502 performs sorting processing by a user ID and performs sorting processing by each area.

Each of the mobile demography units 503 is a server apparatus for performing aggregation processing of the data processed in the peta-mining unit 502, that is for performing counting processing in each item. For example, the mobile demography unit 503 is capable of counting the number of users located in a certain area and of aggregating a distribution of user locations.

Each of the visualization solution units 504 is a server apparatus for performing processing to visualize the data aggregation processed in the mobile demography unit 503. For example, the visualization solution unit 504 is capable of performing processing to map the aggregated data on a map. The data processed in the visualization solution unit 504 is provided to businesses, public sectors, individuals and the like and used for store development, a road traffic survey, disaster measures, environmental measures and the like. It should be noted those statistically processed information are, of course, processed not to violate privacy such that an individual or the like is unable to be identified.

It should be noted that an operator may operate any of the social sensor unit 501, the peta-mining unit 502, the mobile demography unit 503 and the visualization solution unit 504 that are mentioned above and transmit the attribute specifying information for specifying attribute information of a mobile station 100 as a collecting target to mobile stations 100. The mobile station 100 is capable of determining in accordance with the attribute specifying information whether a terminal is designated as the collecting target or not, as described later.

Moreover, in above description of FIG. 1, the description is made assuming a mobile communication network specified in the 3GPP, but the present embodiment is not limited to the mobile communication network specified in the 3GPP. A personal handy phone system (PHS), a communication standard IEEE 802.11 series (IEEE 802.11a/IEEE 802.11b) (Wi-Fi), or a worldwide interoperability for microwave access (WiMax) may be used. For example, in an embodiment using Wi-Fi, there is an access point in place of the base transceiver station and a beacon signal (that corresponds to a notification signal in the mobile communication network) may be used to collect location information of each terminal.

Figure 2:
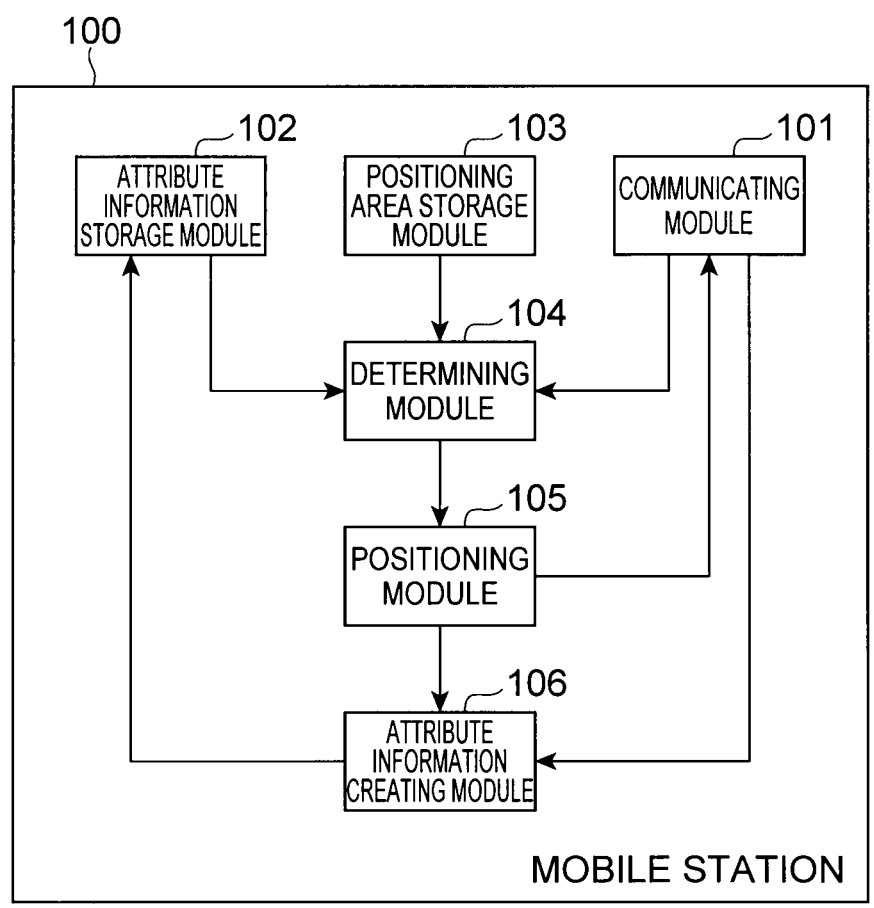
FIG. 2 is a block diagram illustrating function of the mobile station 100.

Next, the mobile station 100 will be described. FIG. 2 is a block diagram illustrating a function of the mobile station 100. The mobile station 100 is configured to include a communicating module 101 (receiving means, notifying means), an attribute information storage module 102 (attribute information storage means), a positioning area storage module 103 (storage means), a determining module 104 (determining means), a positioning module 105 (positioning means), and an attribute information creating module 106 (attribute information creating means). The mobile station 100 is configured with a CPU, a RAM, a ROM, a wireless communication module, a positioning module and the like and in accordance with a program stored in the ROM, the CPU, the wireless communication module, the positioning module and the like operate.

The communicating module 101 is a module for communicating with another communication terminal and further in the present embodiment, is the module for receiving attribute specifying information specified by the management center 500. The communicating module 101 may receive the attribute specifying information by using a HTTP communication protocol and may receive a cell broadcast service (CBS) message transmitted from a cell broadcast center (CBC). Furthermore, the communicating module 101 is the module for transmitting, when measurements of the location are performed by the positioning module 105 in accordance with the attribute specifying information, location information thus measured to the management center 500. It should be noted that the management center 500 may be set as a transmission destination in advance or, alternatively, address information described in the attribute specifying information is stored and the address information may be used as a transmission destination.

The attribute information storage module 102 is a module for storing attribute information indicating a user attribute, an activity range of the user and a usage state of the mobile station 100. FIG. 3 is a diagram describing the attribute information that the attribute information storage module 102 stores. As illustrated in FIG. 3, the attribute information includes: user attribute information indicating a user attribute including a gender, an age, an address and an occupation; current location information indicating a current state; activity state information including an activity state of the user, a migration state indicating a state of the user in migration (in high-speed moving, in low-speed moving and the like) and an activity area size indicating an activity range of the user; and usage state information (for example, a usage state of A service) indicating a usage state by the user of each function (electronic mail, web viewing, electronic money function and the like) in the mobile station 100.

The positioning area storage module 103 is a module for storing a cell ID indicating a cell to designate an area where measurements of the location are performed; and a time period of measurements. The time period may have a positioning start time and an end time in association with each other and may be stored. It should be noted that the cell ID and time period information indicating positioning performance time information (including a start time and an end time) that are stored in the positioning area storage module 103 were transmitted as positioning management information.

Upon receiving the attribute specifying information through the communicating module 101, the determining module 104 serves as a part that determines whether agreement is found between the attribute information stored in the attribute information storage module 102 and attribute information indicated by the attribute specifying information and determines whether measurements of the location are performed or not. For example, when "male" is specified in the attribute specifying information and it is determined that the attribute information of the mobile station 100 is "male" based on a gender item stored in the attribute information storage module 102, the determining module 104 decides to perform measurements of the location.

Furthermore, the determining module 104 may determine based on the positioning area and the positioning time period that are stored in the positioning area storage module 103 whether performing measurements of the location are necessary or not. That is, when agreement is found on the positioning area stored in the positioning area storage module 103 based on the cell ID transmitted from the base transceiver station 200, the positioning module 105 determines to perform measurements of the location. Likewise, when agreement is found on a designated time period, it is determined that measurements of the location are performed.

The positioning module 105 is a module for performing positioning in accordance with a determination result of the determining module 104. For example, the positioning module 105 performs measurements of the location by a global positioning system (GPS).

The attribute information creating module 106 is a module for creating attribute information to be stored in the attribute information storage module 102. The attribute information creating module 106 creates the attribute information indicating each attribute such as an address, an activity area size, a position, an occupation, and a migration state. For example, the attribute information creating module 106 decides a location satisfying a given condition (a location at zero o'clock midnight or a location having a long stay time) as an address based on location information periodically measured by the positioning module 105. Likewise, an occupation can be classified into a company employee or a student based on a location at 12 o'clock noon.

Furthermore, the attribute information creating module 106 extracts an activity area based on a location periodically measured by the positioning module 105 and creates attribute information indicating width and narrowness of an activity range based on a distance between the maximal length end points. Furthermore, the attribute information creating module 106 detects migration between the sectors in accordance with the notification signal received by the communicating module 101 and determines, based on a moving speed calculated from a time interval during the migration or a moving speed calculated from GPS information acquired by the positioning module 105 (alternatively, that may be information obtained by using a pedometer and an accelerometer provided in an apparatus) and the like, whether a migration state is being in high-speed moving or low-speed moving and then creates corresponding attribute information. The attribute information creating module 106 causes the attribute information storage module 102 to store the attribute information thus created.

Furthermore, the attribute information creating module 106 counts frequency in use of communication function such as telephone conversation and electronic mail; various devices such as a non-contact IC card that enables to use electronic money and the like; and various function such as an application and, causes the attribute information storage module 102 to store the communication function, the various devices and the applications of that usage reach the given frequency associated with to the effect. For example, when the application is activated for the given number of times, a usage state of the service provided by the application is stored in association with the effect of high frequency in the attribute information storage module 102.

In this way, the mobile station 100 is capable of efficiently performing measurements of the location processing in accordance with the positioning management table stored in the attribute information storage module 102 and the positioning area storage module 103.

Figure 4:
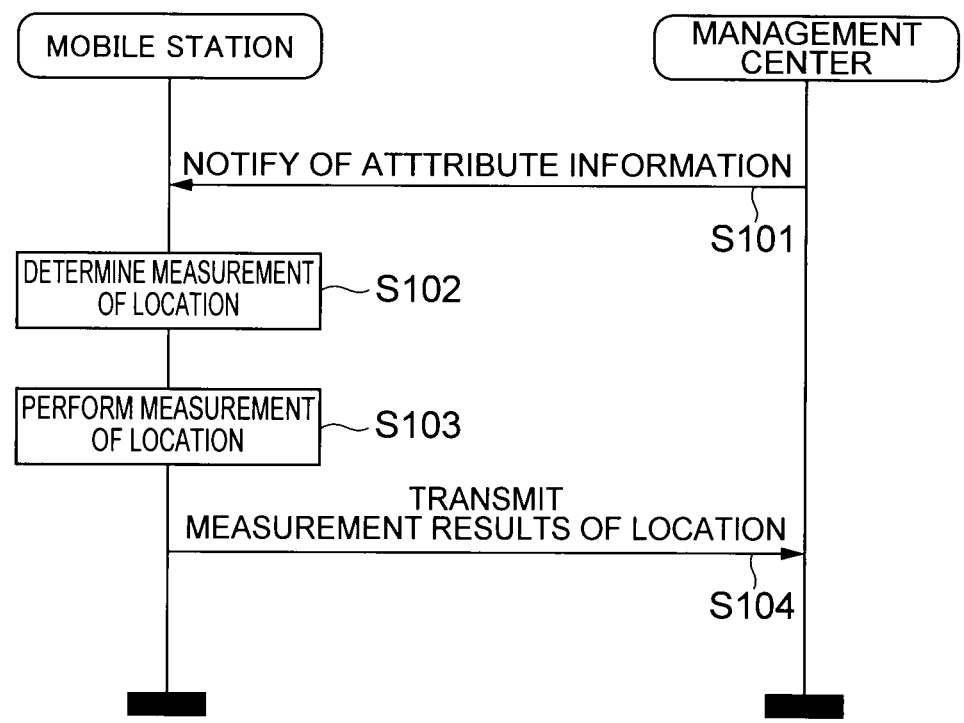
FIG. 4 is a sequence diagram illustrating positioning notification processing between the mobile station 100 and a management center 500.

Next, operation of the communication system 10 of the present embodiment will be described. FIG. 4 is a sequence diagram illustrating positioning notification processing between the mobile station 100 and the management center 500. First, attribute specifying information set in the management center 500 is transmitted to the mobile station 100 (S101). In the mobile station 100, the attribute specifying information is received by the communicating module 101 and based on attribute information specified by the attribute specifying information, the determining module 104 determines whether measurements of the location are necessary or not (S102). That is, when an attribute specified by the attribute specifying information agrees with an attribute indicated by the attribute information stored in the attribute information storage module 102, the determining module 104 determines that measurements of the location are necessary. Then, measurements of the location are performed by the positioning module 105 (S103) and location information thus measured is transmitted by the communicating module 101 to the management center 500 (S104). It should be noted that besides determining the attribute information at S103, further based on a cell ID and positioning performance time information that are included in notification information, when the cell ID is in agreement with the one previously registered and a time period is coincide with the one included in the positioning performance time information, it is determined that measurements of the location are necessary and otherwise, even if agreement is found between the attribute information, it may be determined that measurements of the location are not performed.

Next, creation of the attribute information will be described. FIGS. 5 through 9 are flowcharts illustrating processing when the attribute information creating module 106 creates attribute information. Each illustrates a method for creating the attribute information indicating an address, an activity area size, an occupation and a migration state. Description will be given below in order.

FIG. 5 is a flowchart illustrating processing of the attribute information creating module 106 when the attribute information indicating the address is created. FIG. 5(*a*) is processing when decision is made based on a given time, while FIG. 5(*b*) is processing when decision is made based on a stay time.

First, FIG. 5(*a*) will be described. Using location information indicating a location of the mobile station 100 that is periodically acquired by the positioning module 105, a daily activity area is extracted by the attribute information creating module 106 (S201). Then, for example, a location acquired by the positioning module 105 at zero o'clock midnight is set as a user address of the mobile station 100 and stored in the attribute information storage module 102 (S202). Accordingly, it is possible to automatically create the attribute information indicating the address.

Next, FIG. 5(*b*) will be described. Using location information indicating a location of the mobile station 100 that is periodically acquired by the positioning module 105, a daily activity area is extracted by the attribute information creating module 106 (S201). Then, a location having the longest stay time during a given time unit (for example, one day) in the activity area is set as the address and stored in the attribute information storage module 102 (S202*a*). Accordingly, it is possible to automatically create the attribute information indicating the address.

Figure 6:
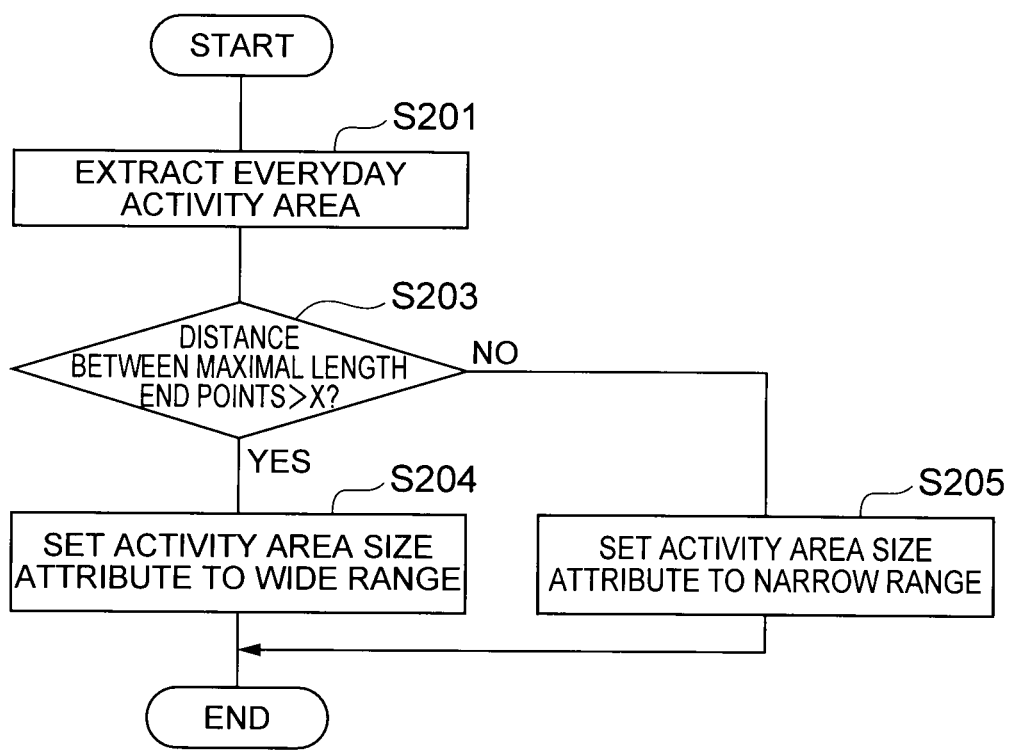
FIG. 6 is a flowchart illustrating processing of the attribute information creating module 106 when attribute information indicating an activity area size is created.

Next, creation of the attribute information indicating an activity area size will be described. FIG. 6 is a flowchart illustrating processing of the attribute information creating module 106 when the attribute information indicating the activity area size is created.

First, using the location information indicating a location of the mobile station 100 that is periodically acquired by the positioning module 105, a daily activity area is extracted by the attribute information creating module 106 (S201). Then, it is determined by the attribute information creating module 106 whether a distance between the maximal length end points in the activity area is larger than any threshold X or not (S203). When it is determined that the distance is larger (S203: YES), the attribute information indicating the activity area size is set to a wide range, which is stored in the attribute information storage module 102 (S204). Furthermore, when it is determined that the distance is smaller (S203: NO), the attribute information indicating the activity area is set to a narrow range, which is stored in the attribute information storage module 102 (S205). Accordingly, it is possible to determine the activity area size and automatically set the size as the attribute information.

Figure 7:
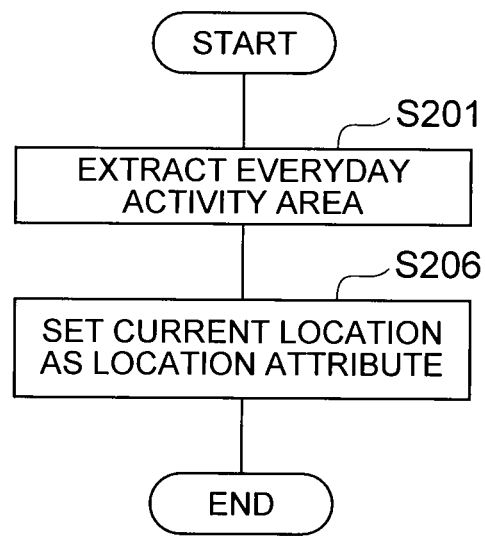
FIG. 7 is a flowchart illustrating processing of the attribute information creating module 106 when attribute information indicating a location is created.

Next, creation of attribute information indicating a location will be described. FIG. 7 is a flowchart illustrating processing of the attribute information creating module 106 when the attribute information indicating the location is created. Using the location information indicating a location of the mobile station 100 that is periodically acquired by the positioning module 105, a daily activity area is extracted by the attribute information creating module 106 (S201). Then, location information indicating a current location just after acquisition is set as the attribute information and stored in the attribute information storage module 102 (S206).

Figure 8:
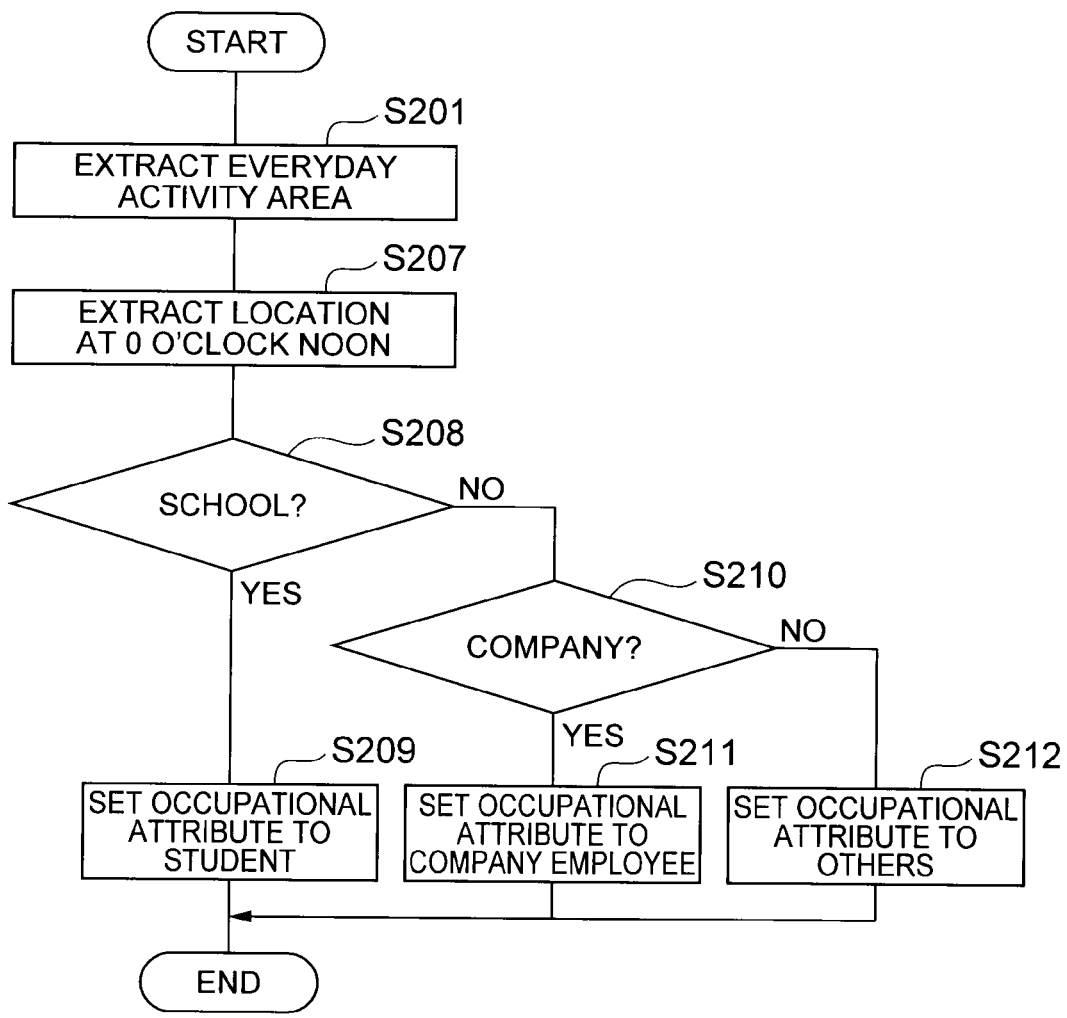
FIG. 8 is a flowchart illustrating processing of the attribute information creating module 106 when attribute information indicating an occupation is created.

Next, creation of the attribute information indicating an occupation will be described. FIG. 8 is a flowchart illustrating processing of the attribute information creating module 106 when the attribute information indicating the occupation is created. As illustrated in FIG. 8, using location information indicating a location of the mobile station 100 that is periodically acquired by the positioning module 105, a daily activity area is extracted by the attribute information creating module 106 (S201). Then, the location of the mobile station 100 at a given time is extracted by the attribute information creating module 106. For example, the location information at zero o'clock noon is extracted (S207).

Then, it is determined by the attribute information creating module 106 whether a school is situated, a company is situated, or neither of them is situated at the location indicated by the location information (S208, S210). Determining processing becomes feasible by getting access to map information distributed via the interne and by determining based on location information thereof (coordinate information) whether a school is situated there or a company is situated there, or not.

Here, when it is determined at S208 that the school is situated there, the occupation in the attribute information is set as student and stored in the attribute information storage module 102 (S209). Furthermore, when it is determined at S210 that the company is situated there, the occupation in the attribute information is set as company employee and stored in the attribute information storage module 102 (S210). Furthermore, when it is determined that neither of them is situated there, the occupation in the attribute information is set as others and stored in the attribute information storage module 102 (S212).

Next, creation of the attribute information indicating a migration state will be described. FIG. 9 is a flowchart indicating processing of the attribute information creating module 106 when the attribute information on the migration state is created. FIG. 9(*a*) is a flowchart illustrating processing to calculate a moving speed based on a migration time between sectors, while FIG. 9(*b*) is a flowchart illustrating processing to calculate the moving speed by using a pedometer and the like.

When the notification signal distributed by the base transceiver station is received by the communicating module 101, a migration between sectors is detected by the attribute information creating module 106 (S301). For example, here, it is possible to determine based on a cell ID included in the notification signal whether the migration across the sector has occurred or not. It should be noted that when the migration between the sectors is detected, the migration time is stored in a storage module such as a buffer (not illustrated).

Then, based on a detection time of the previous migration over sector and a current time, a time interval of the migration between the sectors is detected by the attribute information creating module 106 (S302). It is determined by the attribute information creating module 106 whether the time interval is smaller than a given time (for example, a time X1) or not (S303). Here, when it is determined that the interval is smaller than the given time (S303: YES), the migration state in the attribute information is set as being high-speed moving, which is stored as the attribute information in the attribute information storage module 102 (S304). On the other hand, when it is determined that the interval is larger than the given time (S303: NO), the migration state in the attribute information is set as being low-speed moving, which is stored as the attribute information in the attribute information storage module 102 (S305). In this way, the attribute information on the migration state is set and stored.

Next, FIG. 9(*b*) will be described. The migration speed is detected by a pedometer, an accelerometer, GPS information and the like (S401). It should be noted that the migration speed is created by the attribute information creating module 106 based on various devices such as the pedometer, the accelerometer, a GPS information receiver and the like and the attribute information creating module 106 has function as a speed calculating module.

Then, it is determined by the attribute information creating module 106 whether the migration speed is faster than a given speed (for example, a threshold X2) or not (S402). Here, when it is determined that the speed is faster than the threshold X2 (S402: YES), the migration state in the attribute information is set as being high-speed moving, which is stored as the attribute information in the attribute information storage module 102 (S403). On the other hand, when it is determined that the speed is slower than the threshold X2 (S402: NO), the migration state in the attribute information is set as being low-speed moving, which is stored as the attribute information in the attribute information storage module 102 (S404). In this way, the attribute information on the migration state is set and stored.

As described above, the attribute information illustrated in FIGS. 5 through 9 are created by the attribute information creating module 106 in the mobile station 100, but creation is not limited to being made in the mobile station 100. For example, the daily activity area is extracted in the mobile station 100 and the mobile station 100 transmits the activity area thus extracted to an attribute information creating server (not illustrated). The attribute information creating server may create attribute information of the mobile station 100 based on the activity area extracted in the mobile station 100.

A specific configuration of the attribute information creating server is illustrated in FIG. 10. As illustrated in FIG. 10, an attribute information creating server 600 is further included in the system configuration illustrated in FIG. 1. Specifically, the attribute information creating server 600 creates attribute information by performing creating processing similar to the processing illustrated in FIGS. 5 through 9. The attribute information thus created is replied to the mobile station 100 and stored in the attribute information storage module 102. It should be noted that when the attribute information is created, processing is not limited to the ones in FIGS. 5 through 9. It is considered that by receiving an operation history of a terminal and based on the operation history, the attribute information on a usage state of a service illustrated in FIG. 3 and the like may be created. The attribute information creating server 600 may exist as an external server as illustrated in FIG. 10, but may be placed within the management center 500.

Next, an operation and effect of the mobile station 100 of the present embodiment will be described. In the mobile station 100 of the present embodiment, the communicating module 101 receives a positioning request including attribute specifying information from the management center 500 and the determining module 104 determines, based on the attribute specifying information of the positioning request thus received and attribute information previously stored, whether measurements of the location are necessary or not. Then, when the determining module 104 determines that measurements of the location are necessary, the positioning module 105 performs positioning and notifies the management center 500 of location information thus measured. Accordingly, it is possible to collect the location information of the mobile station that agrees with an attribute that the management center 500 desires and provision of attentive service and the like based on the location information becomes possible. For example, when the attribute information is set to the twenties, and the attribute specifying information is set to male, it is possible to grasp a mobile history and the like of the mobile station that agrees with such an attribute. Accordingly, the mobile history can be used to facilitate store development and the like. It should be noted that a notification destination is not limited to the management center 500. Furthermore, a transmitter of the positioning request and a transmission destination of a positioning result are not necessarily the same.

Furthermore, in the mobile station 100, the positioning module 105 performs measurements of the location on the condition that the determining module 104 determines that the mobile station 100 is being located in the positioning area stored in the positioning area storage module 103 or that a current time is in the time period stored in the positioning area storage module 103 and, therefore, it is possible to collect location information for detailed analysis. For example, it is possible to easily grasp the number of people whose attribute information is set to male and being located in the given positioning area (or at the given time), and the like.

Furthermore, in the mobile station 100, the attribute information to be stored in the attribute information storage module 102 may be information representing a user attribute and; therefore, it is possible to efficiently collect location information focusing on the user attribute. For example, it is possible to collect the location information depending on a gender.

Furthermore, in the mobile station 100, the attribute information to be stored in the attribute information storage module 102 may be activity state information representing a user activity and, therefore, it is possible to efficiently collect location information focusing on a state of the user activity. For example, it is possible to collect the location information of a user who is moving in high-speed with a car and the like.

Furthermore, in the mobile station 100, the attribute information to be stored in the attribute information storage module 102 may be usage state information representing a usage state of a terminal by a user and, therefore, it is possible to efficiently collect location information focusing on the usage state of the terminal by the user. For example, it is possible to collect location information of a user using a given application.

The invention claimed is:

1. A mobile station comprising:
    circuitry configured to
        store attribute information;
        receive a positioning request including the attribute information from an external center;
        determine, based on the positioning request and the attribute information, whether measurement of a location of the mobile station by the mobile station is necessary;
        perform measurement of the location of the mobile station when it is determined that measurement of the location of the mobile station by the mobile station is necessary; and
        notify the location of the mobile station measured by the mobile station.

2. The mobile station according to claim 1, wherein the circuitry is configured to:
    store a positioning time period or a positioning area; and
    perform measurement of the location on a condition that it is determined that the mobile station is located in the positioning area or that a current time is included in the time period.

3. The mobile station according to claim 1, wherein the attribute information comprises user attribute information representing a user attribute.

4. The mobile station according to claim 1, wherein the attribute information comprises activity state information representing a user activity.

5. The mobile station according to claim 1, wherein the attribute information comprises usage state information representing a usage state of a terminal by a user.

6. The mobile station according to claim 3, wherein the circuitry is configured to create the attribute information of a user based on an activity of the user.

7. The mobile station according to claim 6, wherein the circuitry is configured to create the attribute information of the user based on the location of the mobile station during a predetermined time.

8. The mobile station according to claim 6, wherein the circuitry is configured to create the attribute information of the user based on user's location and duration of stay.

9. The mobile station according to claim 1, wherein the circuitry is configured to communicate with a location information storage apparatus that stores location information transmitted from the mobile station.

10. The mobile station according to claim 3, wherein the circuitry is configured to communicate with an attribute information creating server that creates attribute information of a user based on an activity of the user, wherein the attribute information created by the attribute information creating server is stored by the circuitry of the mobile station.

11. The mobile station according to claim 10, wherein the attribute information creating server creates attribute information of the user based on the location of the mobile station during a predetermined time.

12. The mobile station according to claim 10, wherein the attribute information creating server creates attribute information of the user based on user's location and duration of stay.

13. A communication method performed by a mobile terminal, the method comprising:
    receiving a positioning request including attribute information from an external center;
    determining, based on the positioning request and stored said attribute information, whether measurement of a location of the mobile station by the mobile station is necessary;
    performing measurement of the location of the mobile station by the mobile station when it is determined that measurement of the location of the mobile station by the mobile station is necessary; and
    notifying the location of the mobile station measured by the mobile station.

* * * * *